US005458031A

United States Patent [19]

Wolff

[11] Patent Number: 5,458,031

[45] Date of Patent: Oct. 17, 1995

[54] CORE CUTTER

[75] Inventor: Michael J. Wolff, Elmwood Park, Ill.

[73] Assignee: Coiltech Corporation, Schiller Park, Ill.

[21] Appl. No.: 155,837

[22] Filed: Nov. 23, 1993

[51] Int. Cl.[6] .......... B23B 3/04

[52] U.S. Cl. .......... 82/92; 82/70.1; 82/101

[58] Field of Search .......... 82/48, 92, 101, 82/102, 70.1, 72, 92, 97, 101, 102, 53.1, 52; 493/290; 242/523.1, 525, 526

[56] References Cited

U.S. PATENT DOCUMENTS

| | | | |
|---|---|---|---|
| 549,707 | 11/1895 | Denney | 82/53.1 |
| 2,521,003 | 9/1950 | Gitter | 82/101 |
| 2,521,004 | 9/1950 | Gitter | 82/101 |
| 2,764,801 | 10/1956 | Miller | 82/48 |
| 3,911,768 | 10/1975 | Kawano | 82/101 |
| 4,713,992 | 12/1987 | Languillat | 82/48 |
| 5,170,684 | 12/1992 | Lofstrom | 82/70.1 |

*Primary Examiner*—Jack W. Lavinder

*Attorney, Agent, or Firm*—Baker & Daniels

[57] ABSTRACT

An adjustable cardboard core cutter for precisely cutting cardboard tubes used as cores in steel slitting operations. The core cutter includes an axially fixed main shaft fixed core support plate, and an axially shiftable core support plate. Cores to be cut are clamped to the shiftable plate which axially shifts in response to preset instructions. An axially fixed cutter serves to cut the core into precise widths.

16 Claims, 5 Drawing Sheets

CORE CUTTER

FIELD OF THE INVENTION

This invention relates to slitting machines and has special application to a cutter used in slitting cores for steel coils.

BACKGROUND OF THE INVENTION

Core cutters are machines which are associated closely with steel slitting operations. Namely, slit steel is recoiled onto cardboard cores which must closely approximate the width of each steel strand. Such cores are normally cut from long, thick cardboard tubes.

Prior art core cutters included machines which had a manually shiftable core support plate and a fixed cutter as shown in the attached John Dusenberry advertisement. Such core cutters were simple to operate and took up little space, but were not accurate and also slow in operation.

An automatic adjustable core cutter such as the machine shown in U.S. Pat. No. 5,170,684 utilized a fixed core and a movable cutter. Machines with movable cutters are not preferred because they require constant width support mandrels which are bulky and expensive. Since typical users of core cutters often use up to seven different diameters of cores, stocking and replacing these mandrels is both time consuming and costly.

SUMMARY OF THE INVENTION

The core cutter of this invention includes an axially fixed main support shaft which carries a stationary outboard core support plate and a shiftable inboard core support plate. A power motor serves to rotate a screw connected to a carriage of the inboard core plate. The inboard plate shifts along the main shaft relative to the outboard plate. A second power motor serves to rotate the main shaft when core cutting is to be performed.

An adjustable cutter and core support rollers are connected to the machine frame. When the core has been properly positioned according to preprogrammed instructions fed into the machine's microprocessor and read by an encoder connected to the power driven screw, the rollers are adjusted to snugly accommodate the core and the cutter is drawn into contact with the rotating core to cut the core into the desired widths.

Because of the construction of the machine, positive support is provided for the core all during cutting and shifting operations. Also, due to the digital position sensors and the drive mechanisms, highly accurate core cutting is achieved rapidly and at relatively low cost when compared to prior art core cutting machines.

Accordingly, it is an object of this invention to provide for a novel and improved core cutting machine.

Another object is to provide for a core cutter which is rapidly and accurately adjusted to cut a single core into varying preselected widths.

Another object is to provide for a core cutter which is readily adapted to accommodate any of a number of core diameters.

Another object is to provide for a core cutter which is reliable and inexpensive to maintain.

Another object is to provide for a core cutter which positively supports the core at all times during core cutting operations.

Other objects will become apparent upon a reading of the following description.

BRIEF DESCRIPTION OF THE DRAWINGS

A preferred embodiment of the invention has been depicted for illustrative purposes only wherein.

DESCRIPTION OF THE PREFERRED EMBODIMENT

The preferred embodiment herein described is not intended to be exhaustive or to limit the invention to the precise form disclosed. It is chosen and described to explain the principles of the invention and its application and practical use to enable others skilled in the art to utilize its teachings.

Figure 5:
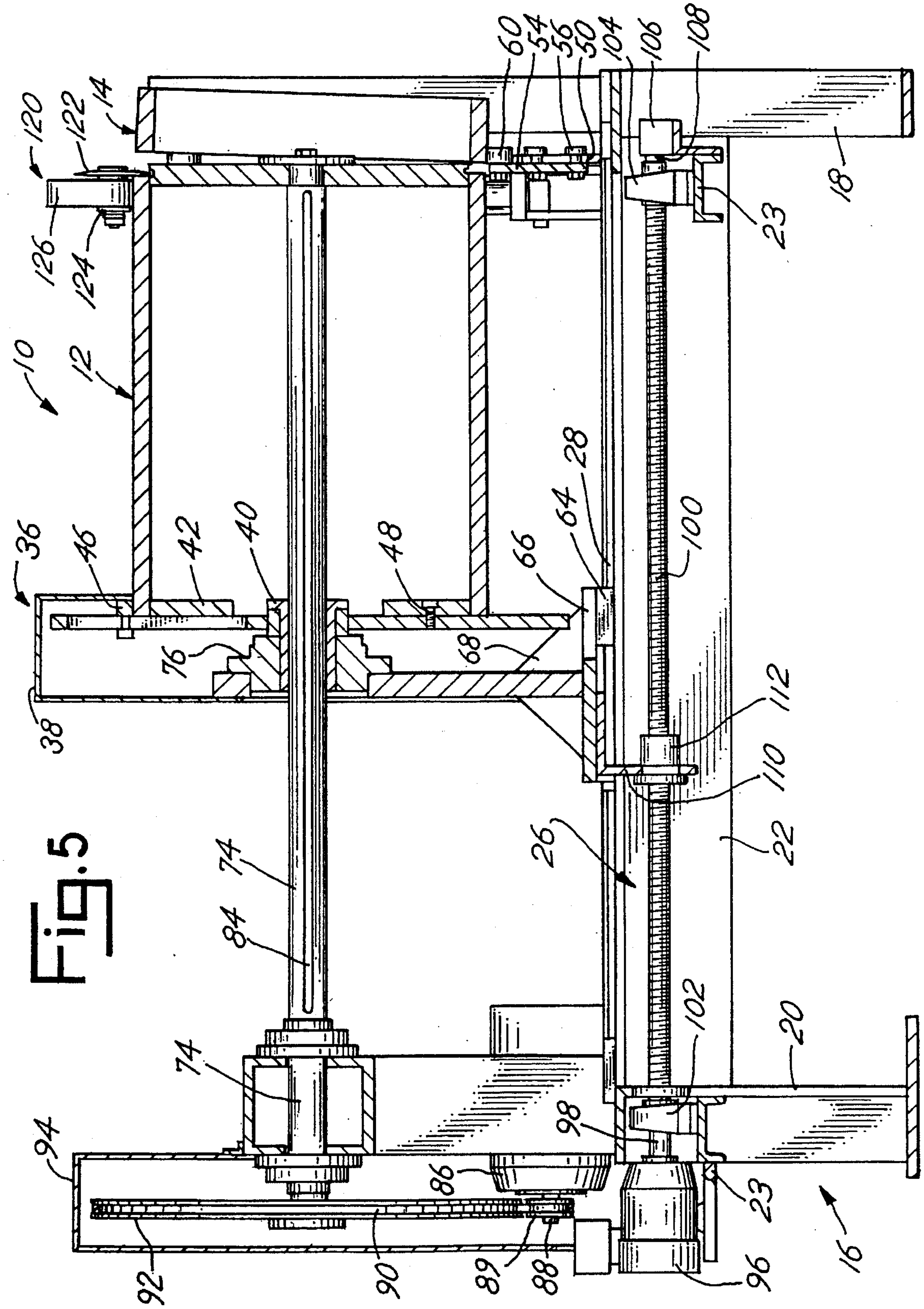
FIG. 5 a sectional view similar to FIG. 3, but showing the core in a second cut position with the inboard housing shifted.

Referring now to the drawings, reference numeral 10 generally designates the core cutting machine of this invention. Machine 10 is adapted for use in cutting a cylindrical core 12 into precise widths. Cut cores 14 (FIG. 5) are used in steel slitting operations at the recoiler machine (not shown) with slit steel being wound about the cores after slitting. Core 12 is generally a long cylindrical tube preferably formed of a treated paper or cardboard material. The widths of individual cut cores 14 are preferably the same width as the strips of slit steel which are to be wound about the cores.

Machine 10 preferably operates as a stand alone unit and includes a base frame 16 defined by outboard support legs 18, inboard support legs 20, braces 22 and a support table 24. Legs 18 and 20 are spaced apart a preset distance and are spanned by braces 22 as shown.

Table 24 has an elongated opening 26 therethrough. Guide rails 28 and 30 are connected to table 24 adjacent to opposite sides of opening 26. Each guide rail 28 and 30 has an outer groove 32, 34, respectively which runs down the long axis of each guide rail.

Inboard housing 36 is shiftably connected to support table 24. Inboard housing 36 includes frame 38 and a chuck 40. Chuck 40 includes core support disk 42 and has slots 44 which accommodate shiftable chuck clamps 46. Disk 42 is preferably of the same diameter as the inner diameter of core 12 and is removably fastened to chuck 40 as by fasteners 48 to allow rapid changes as needed.

Inboard housing 36 also includes guide runners 64 which are supportively connected to the inboard housing as by bracket 66 and wedges 68. Guide runners 66 preferably form a tongue and groove joint with guide rails 28 which allows lateral shifting of inboard housing 36 while preventing axial shifting thereof.

Machine 10 also includes core support bracket 50. Bracket 50 is connected to support table 24 as by fasteners 52 and is generally L-shaped as shown. Y-bracket 54 is shiftably carried by L-bracket 50 as by fasteners 56 which slide in slot 58. Rollers 60 are rotatably connected to Y-bracket 54 as by pins 62 and serve to support a rotating core 12.

Support frame 70 extends upwardly from table 24 and includes support bearing 72. Shaft 74 is rotatably housed in bearing 72 and extends through bearing 76 of chuck 40 and through chuck 40 and disk 42 as shown. Core support disk 78 is connected to the terminal end of shaft 74 as by collar 80. Disk 78, like disk 42 is preferably of the same diameter as the outer diameter of core 12. Disk 78 may have a circumferential groove 82 as shown. Shaft 74 includes elongated key 84 which mates with a groove (not shown) in chuck 40 to permit correlative rotation of the shaft and chuck.

Motor 86, preferably an AC electric motor, is connected to support table 24. Motor 86 includes rotatable drive shaft 88 and pulley 89. Flywheel 92 is connected to the proximal end of shaft 74. A drive belt 90 is connected between drive shaft pulley 89 and flywheel 90 to transmit rotational movement of the drive shaft to the flywheel and thence to shaft 74. Cover housing 94 encloses flywheel 90 as shown.

Machine 10 also includes motor 96, preferably a DC electric motor, supported by cross brace 23. Motor 96 has its drive shaft 98 connected to the proximal end of an elongated drive screw 100 as by bearing 102. Drive screw 100 has its distal end housed in bearing 104 which is carried by cross brace 23. Encoder 106 has a shaft 108 in communication with bearing 104 and serves to precisely measure the rotations of drive screw 100.

Connecting bracket 110 is connected to and extends downwardly from inboard housing 38. Threaded fitting 112 is carried by connecting bracket 110 with drive screw 100 extending through the fitting.

Microprocessor 114 is electrically coupled to encoder 106 as by electrical leads 116. Microprocessor 114 is also connected to a power source (not shown) and to motor 86 and serves to control the operation of machine 10 in response to both preprogrammed instructions and by manually operated switches 118.

Cutting assembly 120 includes cutting disk 122 which is rotatably carried by bearing 124 attached to cutting arm 126. Cutting arm 126 is pivotally connected to an extensible rod 128 of power actuated cylinder 130. Cylinder 130 is pivotally connected to clevis 132 which is secured to support table 24. Support post 134 is connected to and extends upwardly from table 24. Bearing 136 is connected between cutting arm 126 and post 134. Cutting disk 122 is formed of a durable, corrosion-resistant metal and honed to a sharp edge.

Figure 1:
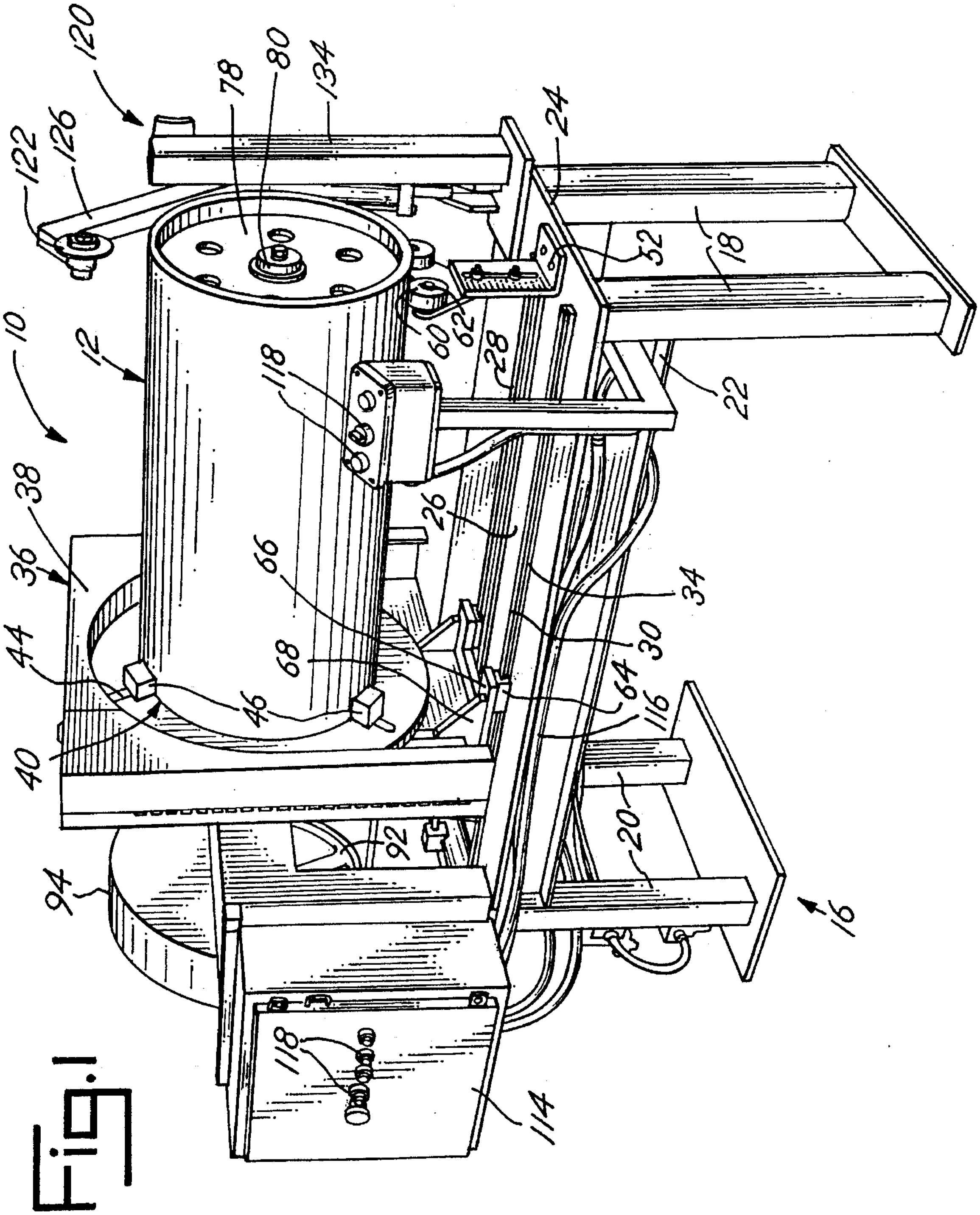
FIG. 1 is a perspective view of the core cutter of this invention with a cardboard core affixed.
Figure 2:
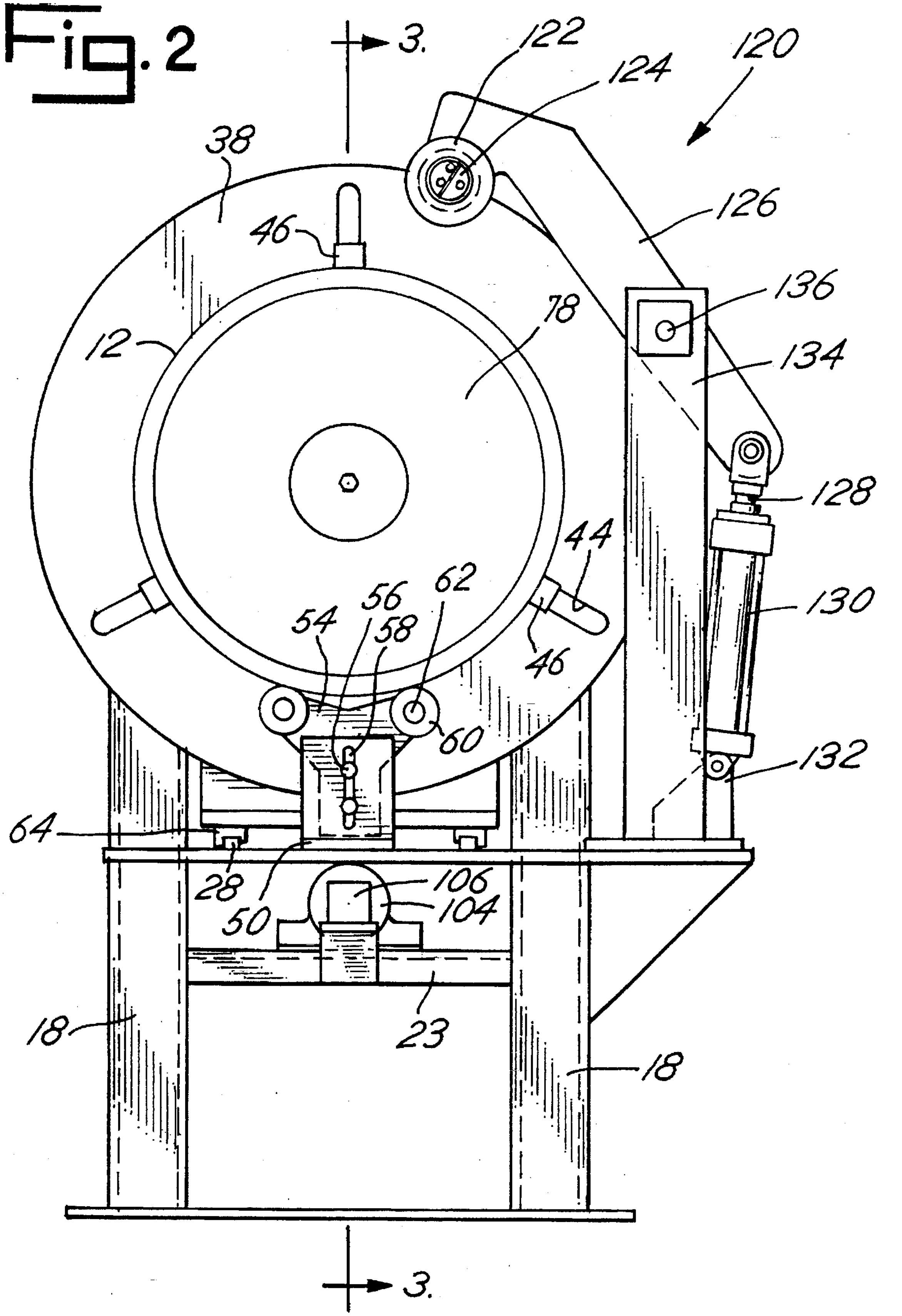
FIG. 2 is an end elevation view of the core cutter showing a core fitted onto the support plates.
Figure 3:
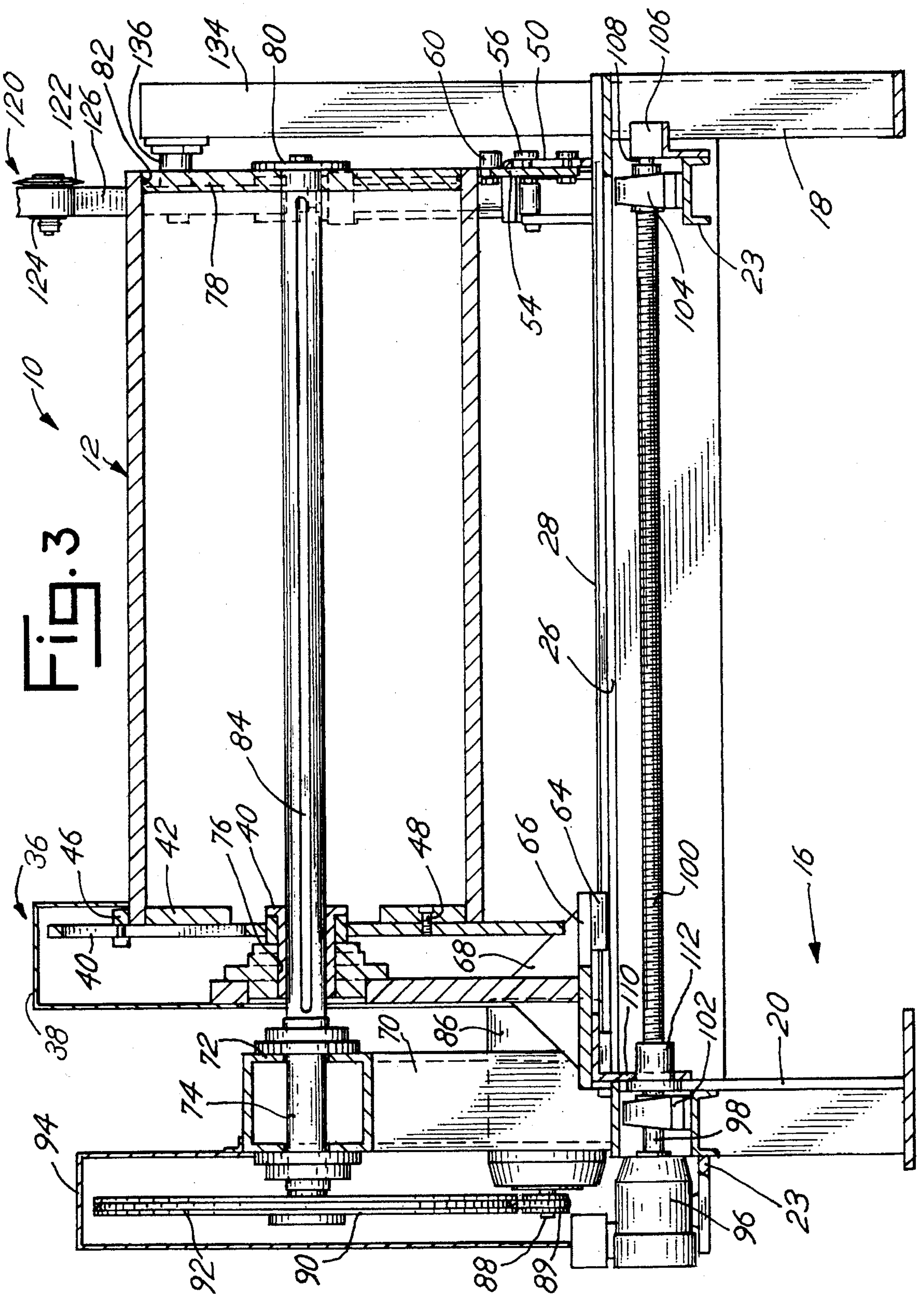
FIG. 3 is a sectional view taken along line 3—3 of FIG. 2.
Figure 4:
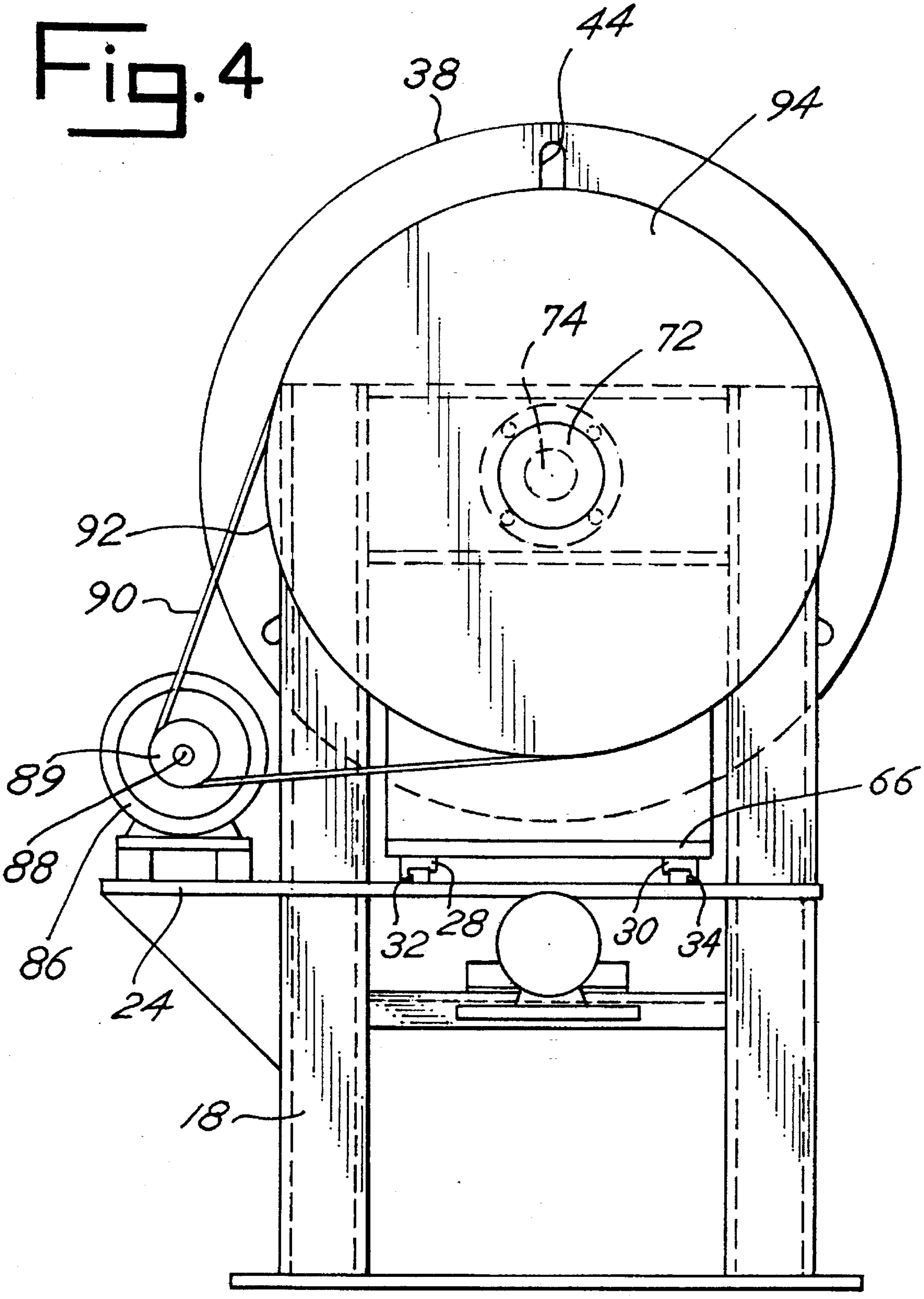
FIG. 4 is an end elevation view of the core cutter showing the motor drives.

Machine 10 functions to precisely cut full length cardboard tube cores 12 into multiple sections 14. With inboard housing 36 at its full retracted position of FIG. 1, a core tube 12 is loaded into the machine with its first end against frame 38. Disks 42 and 78 are of preferably the same diameter as the inner diameter of core tube 12 and provide lateral support for the core while not impeding its sliding movement. Chuck clamps 46 are shifted in slots 44 and firmly seat against core 12 to prevent rotation of core 12 relative to disks 42, 78. Rollers 60 are then adjusted to cradle core 12 and provide support during cutting operations.

An operator next programs the desired widths of core sections 14 to be cut from core 12 into the microprocessor 114. Machine 10 is switched on and motors 86 activates to turn flywheel 92 and shaft 74 as described above. Due to the connection between shaft 74, chuck 40, clamps 46 and core tube 12, the core tube rotates at the same velocity as shaft 74.

Encoder 106 through its shaft 108 senses the position of inboard housing 36 by reading the number of revolutions of drive screw 100. When microprocessor 114 so instructs, (based on the preprogramming) motor 96 activates to turn drive screw 100. Due to the threaded connection of drive screw 100 and fitting 112, the fitting advances in a linear fashion, and the fitting connection to housing 36 allows the inboard housing to shift as well. When the core reaches its first cutting position (,as determined by the preprogramming as read by encoder 106), motor 96 switches off. Fluid is delivered to power cylinder 130 and causes rod 128 to extend. This pivots cutting arm 126 and cutting disc 122 with the disc penetrating and cutting into the rotating core 12. Cutting disc 122 is aligned with support disk 78 and particularly with groove 82 to provide radial support for the core and insure an even cut.

After cutting is complete, the motor 96 activates to advance inboard housing 36 and core 12 to the next preprogrammed position. This operation continues until all desired core sections 14 have been cut. Guide rails 28, 30 coact with runners 66 to ensure accurate linear movement of inboard housing 36 and core 12 relative to shaft 74 and support disk 78 (which remain stationary).

It is understood that the above description does not limit the invention to the precise form disclosed, but may be modified within the scope of the following claims.

What is claimed is:

1. A machine for separating a tube into a plurality of cores, said machine comprising a frame, a rotatable shaft having first and second ends, means carried by said frame for supporting said rotatable shaft, a motor mounted on said frame for effecting rotation of said shaft about an axis, a first plate detachably connected to said shaft adjacent said first end, said first plate being movable relative to said shaft along said axis a second plate detachably connected to said shaft adjacent said second end, said first and second plates constituting means for supporting a tube to be rotated along with said shaft, blade means pivotally mounted to said frame for cutting a rotating tube, carriage means shiftably mounted to said frame and movable relative to said shaft and said second plate for supporting said first plate for movement relative to the shaft, clamp means for fixedly connecting a tube to said first plate wherein the tube shifts axially along with said carriage means and means for shifting said carriage means.

2. The machine of claim 1, wherein said first plate is mounted on said shaft through a splined connection about the shaft.

3. The machine of claim 1 wherein said frame includes a table, said carriage means includes a bearing head shiftably connected to said table, and said means for shifting includes a rotatable threaded member, said bearing head including a connector block, said threaded member extending through said connector block whereby rotation of said threaded member effects axial travel of connector block and bearing head.

4. The machine of claim 3 wherein said table includes spaced guide rails extending therefrom, said bearing head including guide means coacting with said rails for ensuring straight-line movement of said bearing head.

5. The machine of claim 3 wherein said machine further includes support means for supporting said tube for movement relative to said second plate.

6. The machine of claim 5 wherein said support means includes a support member mounted on said table, and a roller shiftably connected to said support member for movement between a first position engaging a tube to be cut and a second position spaced from the tube wherein axial shifting of the tube may be effected.

7. The machine of claim 3 and programmable means operably associated with one of said threaded member and connector block for sensing the position of said first plate relative to said blade means wherein accurate dimensions are achieved for cores cut from a tube.

8. The machine of claim 7 wherein said programmable means includes an encoder operably connected to said threaded member, and a microprocessor connected to said encoder.

9. A machine for separating a cardboard tube into a plurality of cores, said machine comprising:

a frame;

a carriage shiftably mounted to said frame between a plurality of positions;

a shaft having first and second ends, said shaft journalled in and fixedly mounted to said frame wherein the shaft does not shift in an axial direction;

a first tube support plate carried by said shaft and movable with said carriage relative to said shaft adjacent said first end, chuck means carried by said carriage for clamping a cardboard tube to said first plate;

a second tube support plate carried by said shaft adjacent said second end;

a motors means mounted on said frame for rotating said shaft along an axis of rotation;

shift means for effecting axial shifting of said carriage relative to said shaft between its plurality of positions; and blade means mounted to said frame adjacent said second plate for cutting a rotating tube.

10. The machine of claim 9 wherein said frame includes a table, spaced guide rails carried by said table, said carriage including rollers operably associated with said guide rails.

11. The machine of claim 9 wherein said shift means includes a threaded member, said carriage including a block operably connected to said threaded member, said block and threaded member constituting means for translating rotational movement of the threaded member into axial movement of said block and carriage relative to said shaft.

12. The machine of claim 9 wherein said machine further includes tube support means for supporting said tube about said second plate.

13. The machine of claim 12 wherein said tube support means includes a support member connected to said table, and a roller shiftably connected to said support member between a first position engaging and supporting said tube, and a second position spaced from the tube wherein axial shifting of the tube may be effected.

14. The machine of claim 9 wherein said chuck means includes first and second blocks shiftably connected to said carriage between a loading position spaced from said first plate and a clamped position contacting said tube and clamping the tube to the first plate.

15. The machine of claim 9 wherein said frame includes an upright support, said blade means including an arm pivotally connected to said upright support, and a cutting blade rotatably mounted to said arm, said cutting blade aligned with a peripheral edge of said second plate, said arm being pivotal about said upright support between a standby position with the cutting blade spaced from the tube and a cutting position with the cutting blade contacting and cutting said tube.

16. The machine of claim 9, wherein said first plate is mounted on said shaft through a splined connection about the shaft.

* * * * *